US005099382A

United States Patent [19]

Eppinger

[11] Patent Number: 5,099,382

[45] Date of Patent: Mar. 24, 1992

[54] ELECTRICAL RECLOSER HAVING EXTERNAL MOUNTING ARRANGEMENT FOR ELECTRONICS ASSEMBLY

[75] Inventor: David P. Eppinger, Centralia, Mo.

[73] Assignee: A. B. Chance Company, Centralia, Mo.

[21] Appl. No.: 463,472

[22] Filed: Jan. 11, 1990

[51] Int. Cl.$^{5}$ .............................................. H02H 3/08

[52] U.S. Cl. ...................................... 361/115; 361/38; 361/72; 361/335; 200/148 B; 335/26

[58] Field of Search ................. 361/114, 115, 72, 102, 361/38, 335, 379, 385; 335/26; 200/148 B

[56] References Cited

U.S. PATENT DOCUMENTS 3,671,688 6/1972 Nitta .............................. 200/148 R
4,207,446 6/1980 Sasaki et al. .................... 200/148 R

OTHER PUBLICATIONS

PMR SP6 Pull Mounted Auto Recloser Brochure; Brush Switchgear (no date available).
GIR SP6 Pull Mounted Auto Recloser Brochure; Brush Switchgear (no date available).

*Primary Examiner*—Todd E. DeBoer
*Attorney, Agent, or Firm*—Hovey, Williams, Timmons & Collins

[57] ABSTRACT

An electrical recloser apparatus includes a tank (10) having bottom, top and side walls (18, 22, 16) which define an interior, sealed space (14), and a current interrupter (44) disposed within the sealed space (14) and including a pair of relatively movable contacts (46, 48) which are movable between a closed, current-carrying position and an open, current-interrupting position. A control assembly (30) is provided for electronically controlling the opening and closing of the contacts (46, 48), the control assembly (30) initiating operation of the contact moving means (58) to move the contacts (46, 48) to the open position in response to a fault current sensed by a sensing means (66), and initiating operation of the contact moving means (58) to move the contacts (46, 48) to the closed position after each one of a predetermined number of opening operations. The control assembly (30) is mounted on the bottom wall (18) of the tank (10) exterior of the sealed space (14), and the side wall (16) of the tank (10) preferably extends beyond the bottom wall (18) to provide a solar shield for the control assembly (30). Further, the control assembly may be mounted in a housing (32) which is removably supported adjacent the bottom wall (18) of the tank (10) to permit removal of the control assembly (30) for replacement or reprogramming.

7 Claims, 5 Drawing Sheets

ELECTRICAL RECLOSER HAVING EXTERNAL MOUNTING ARRANGEMENT FOR ELECTRONICS ASSEMBLY

BACKGROUND OF THE INVENTION

1. Field of the Invention

The present invention relates to electrical distribution equipment and, more particularly, to a recloser apparatus having an electronic control assembly mounted adjacent the bottom wall of the recloser tank.

2. Discussion of the Prior Art

It is known to provide a three-phase recloser with an electronic control assembly for controlling various operations of the device. In these devices, various mounting arrangements are used to support the control assembly either on or adjacent a tank of the recloser in which a current interrupter is provided.

Further, a separate control module is provided for housing the control assembly of the recloser, the module being a self-standing unit which is housed in a separate casing that is, in turn, attached to the utility pole or secured to a platform resting on the ground. Numerous drawbacks exist in the currently available constructions. For example, because known control units are housed apart from the tank of the recloser, additional material is used and the expense of constructing the device is relatively escalated.

OBJECTS AND SUMMARY OF THE INVENTION

It is an object of the present invention to provide a recloser apparatus having an electronic control assembly mounted on the tank of the recloser adjacent the bottom wall thereof, such that the control assembly is protected from solar temperature rise by the tank walls.

Another object of the invention is to provide a recloser apparatus that includes an electronic control assembly that is mounted on the tank of the recloser but which is distanced sufficiently and shielded from the electromagnetic field at the top of the recloser apparatus to prevent interference with the control assembly and is readily accessible to a lineman approaching the apparatus.

A further object of the invention is to provide a recloser apparatus in which an electronic control assembly is removed from the heat of the interior space of the tank so that damage to the control assembly is not caused due to exposure of the assembly to such heat.

According to one aspect of the invention, an electrical recloser apparatus comprises a housing or tank having bottom, top and side walls which define an interior, sealed space in which a current interrupter is disposed. The current interrupter includes a pair of relatively movable contacts movable between a closed, current-carrying position and an open, current-interrupting position, and contact moving means for moving the contacts between the closed, current-carrying position and an open, current-interrupting position. Sensing means are included in the recloser apparatus for sensing a fault current experienced by the apparatus, and control means are provided for electronically controlling the operation of the contact moving means.

The control means is operable to initiate operation of the contact moving means to move the contacts to the open position in response to a fault current sensed by the sensing means, and to initiate operation of the contact moving means to move the contacts to the closed position after each one of a predetermined number of opening operations. Mounting means are also included in the apparatus for mounting the control means on the bottom wall of the insulating tank exterior of the sealed space.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figure 1:
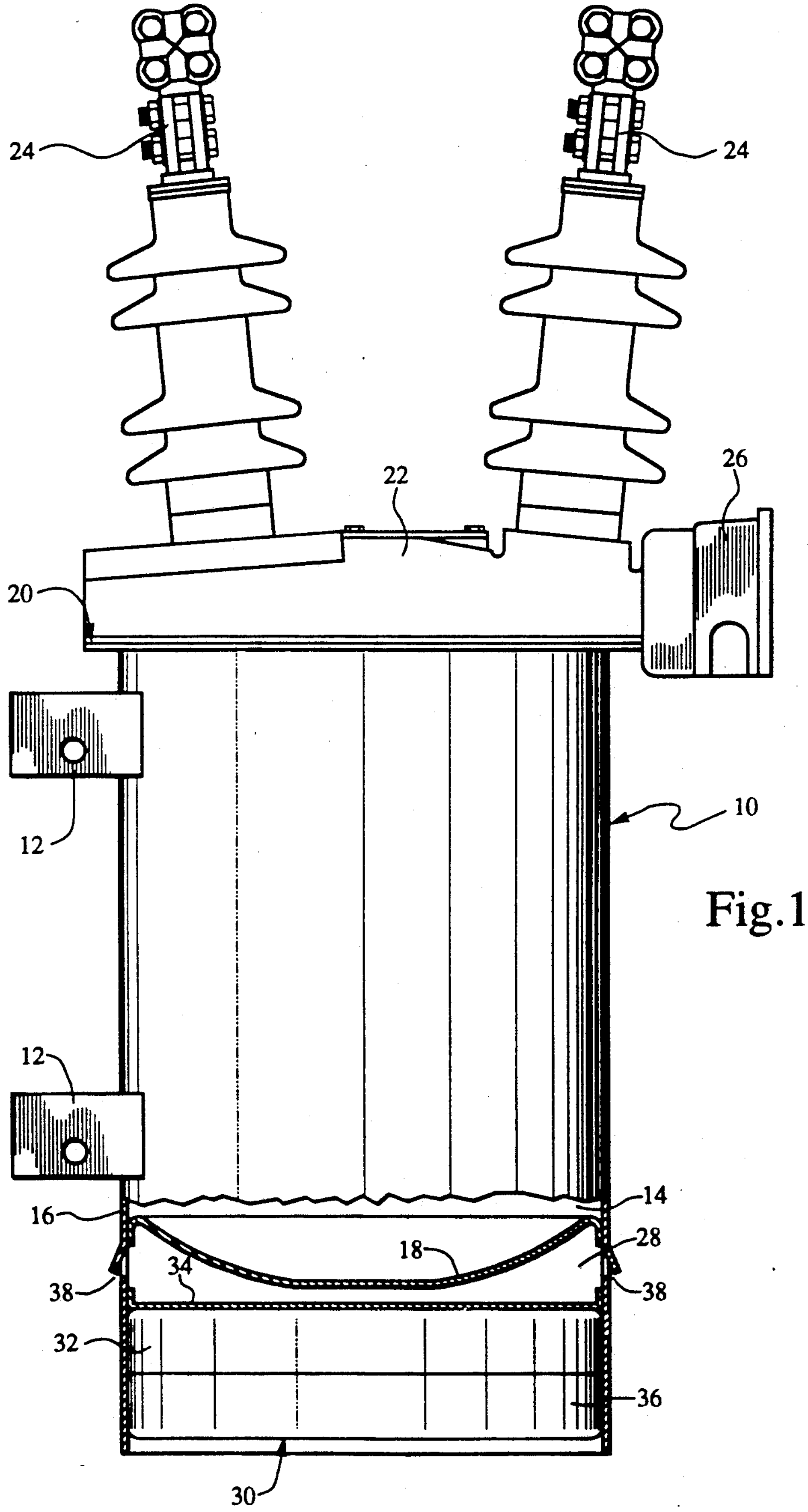
FIG. 1 is a side elevation view, partially cut away, of a recloser apparatus constructed in accordance with the invention.

A recloser apparatus constructed in accordance with a preferred embodiment of the present invention is shown in FIG. 1, and includes a tank 10 having a set of mounting brackets 12 thereon by which the recloser may be mounted to a utility pole or the like.

The tank 10 defines a sealed interior space 14 which is preferably filled with an insulating gas such as $SF_6$ gas or the like, and which houses an interrupter assembly as described below. The tank 10 is formed of a generally cylindrical side wall 16, a bottom wall 18, and an upper end 20 provided with an opening that is normally sealed by a cover 22. A pair of bushings 24 extend through the cover 22 into the interior space 14 and an operating assembly is preferably provided for permitting operation of the apparatus from outside the tank 10.

At the lower end of the tank, the side wall 16 extends beyond the bottom wall 18 by a distance of several inches so as to define a shielded space 28 that is exterior of the interior sealed space 14. A control assembly 30 is secured to the recloser within this shielded space 28 and includes an upper support pan 32 that is attached to a /mounting bar 34 extending across the shielded space 28 beneath the bottom wall 18.

A pan cover 36 is provided on the bottom of the support pan 32 and encloses the interior of the support pan 32 to protect the interior of the pan from overexposure to the environment and from mechanical shocks and the like. However, the cover 36 is preferably not in air-tight or water-tight sealing engagement with the pan 32 in order to permit the interior space of the control assembly to breathe and to protect the hardware within the assembly 30 from condensation effects and the like. In addition, several ventilation openings 38 are provided in the side wall 16 of the tank 10 at a position immediately beneath the bottom wall 18 to further expedite air flow through the shielded space 28.

Figure 2:
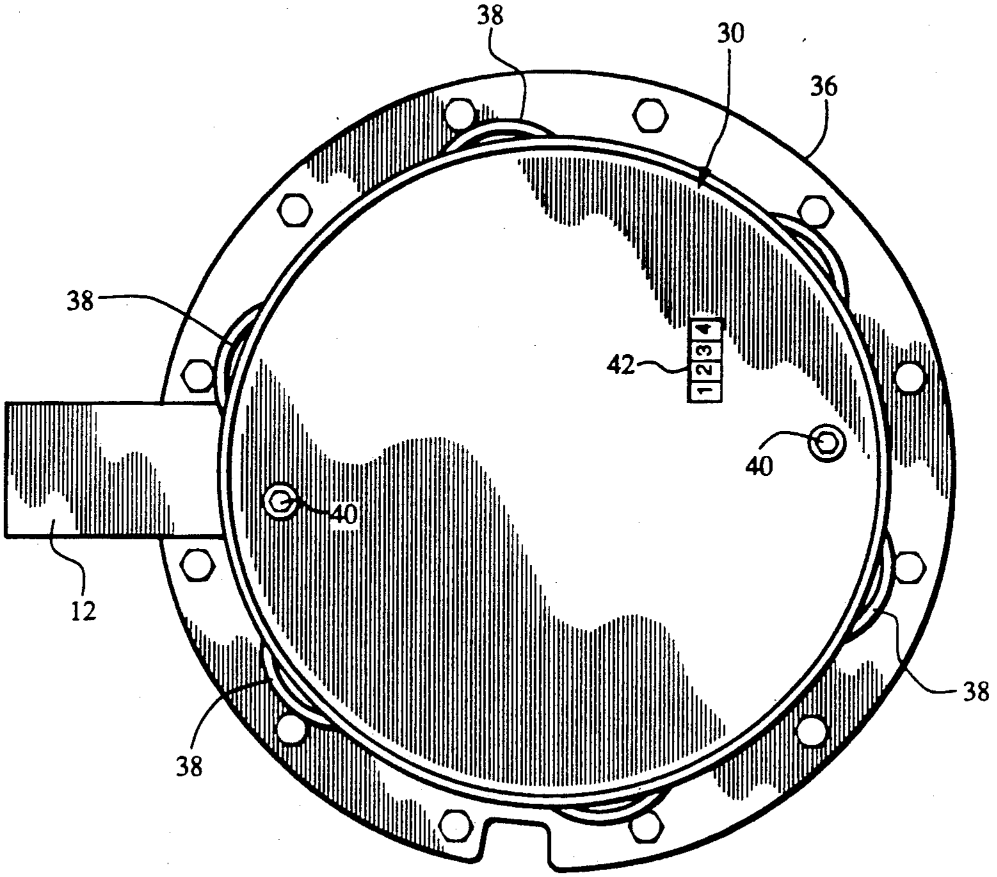
FIG. 2 is a bottom plan view of the recloser apparatus.

Turning to FIG. 2, the cover 36 is shown as being secured to the support pan 32 by a pair of threaded bolts 40 or the like which extend through the cover 36 and into receiving openings in the support pan 32. An opening is provided in the cover of the assembly through which a counter 42 is visible for displaying trip information concerning the interrupter within the sealed space 14 of the tank 10.

Figure 3:
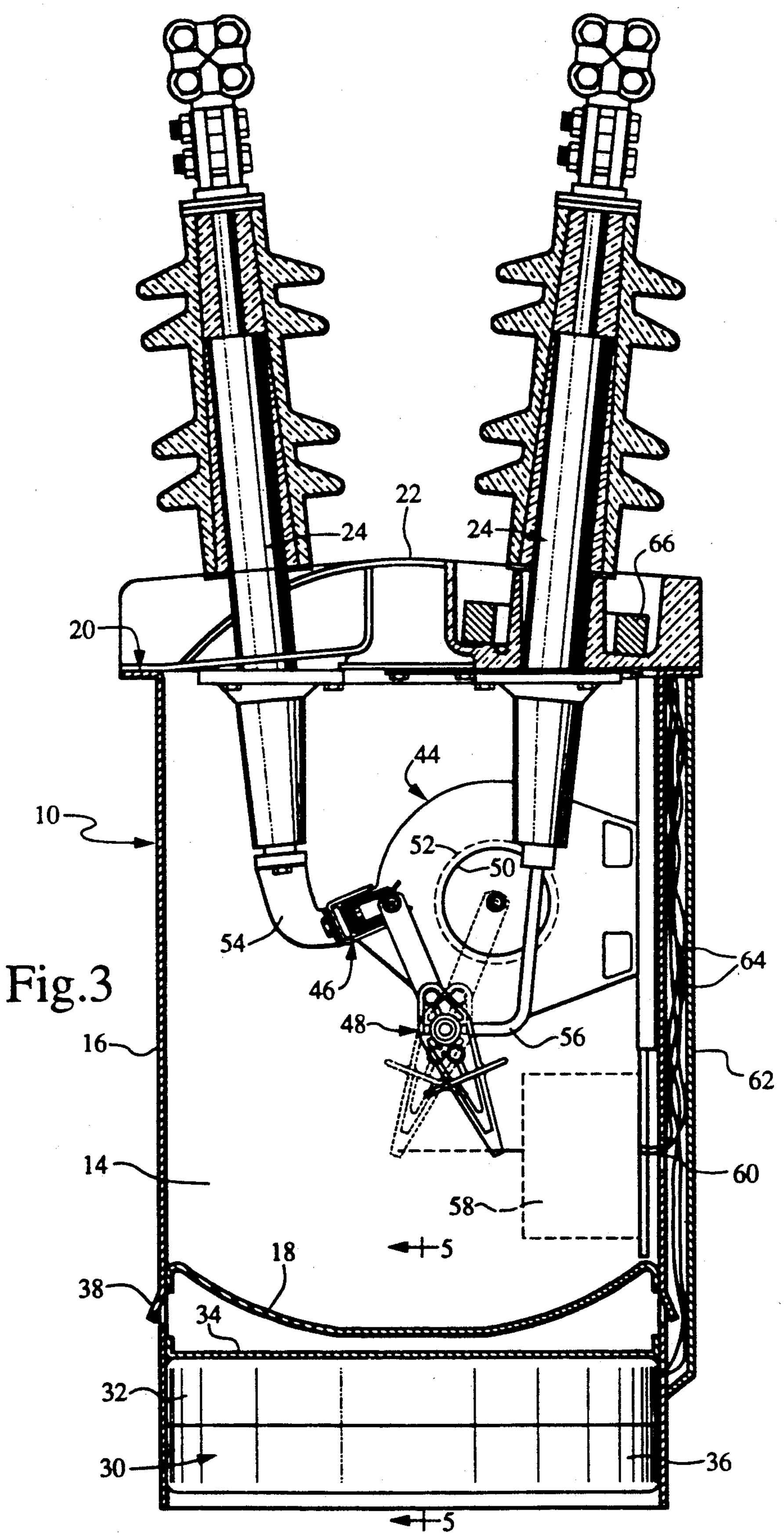
FIG. 3 is a side sectional schematic view of a recloser apparatus constructed in accordance with the invention.

In FIG. 3, an interrupter assembly 44 is shown schematically as being disposed within the sealed interior space 14 and including a pair of relatively movable contacts 46, 48 movable between a closed, current-carrying position and an open, current-interrupting position. In the illustrated embodiment, one of the contacts 46 is fixed, while the other contact 48 is movable between the closed and tripped positions. In addition, a ring electrode 50 is provided which is electrically connected to the fixed contact via a field coil 52 so that upon separation of the movable contact 48 from the fixed contact 46, any arc extending therebetween is extinguished with the assistance of the electromagnetic field generated within the ring electrode 50. One example of a preferred interrupter assembly capable of use with the present invention is disclosed in copending U.S. Ser. No. 446,476, filed on Dec. 5, 1989, by Eppinger et al., and this discloser is incorporated herein by this express reference.

In the illustrated interrupter assembly, the fixed contact 46 is connected via a conductor 54 to one of the bushings 24 and a further conductor 56 connects the movable contact 48 with the other bushing 24. Thus, when the contacts 46, 48 are in the closed condition, current flows between the bushings via the interrupter assembly 44. It is understood that as an alternative to the interrupter assembly illustrated as the preferred embodiment, any known interrupter construction could be employed with the invention while still receiving the benefits of the present invention.

A contact moving assembly 58 is also shown schematically in FIG. 3, and preferably includes means for moving the contacts 46, 48 between the closed, current-carrying position and the open, current-interrupting position. A preferred construction of the contact moving means is disclosed in copending U.S. Ser. No. 463,452, filed concurrently with the present application by Kamp, and incorporated herein by this express reference. However, any contact moving means may be employed for interrupting the current through the apparatus without departing from the present invention.

The contact moving assembly 58 is connected to the control assembly 30 by one or more lead wires 60 which pass from the sealed interior space 14 through either the wall 16 or cover 22 of the tank 10, and which are protected from complete exposure to the environment by a wire channel 62 fastened to the outside surface of the tank 10 along one side thereof. Although not shown, it is preferred that the wires 60 extend through the cover 22 in order to reduce machining of the tank 10. Additional wires 64 also extend between the control assembly 30 and a current transformer 66 provided around one of the bushings 24. This current transformer 66 serves as a fault current sensing means for sensing a fault current experienced by the recloser apparatus. Hall effect devices and the like may also be used to perform this function. Wires also extend from the control assembly 30 to the operating assembly 26 to permit transmission of control and actuation signals therebetween and a trip counter sensing means (not shown) is provided for signalling the control assembly 30 and counter 42 each time a tripping operation is carried out by the interrupter assembly 44. The counter 42 may alternately be operated during each closing operation of the interrupter.

Figure 4:
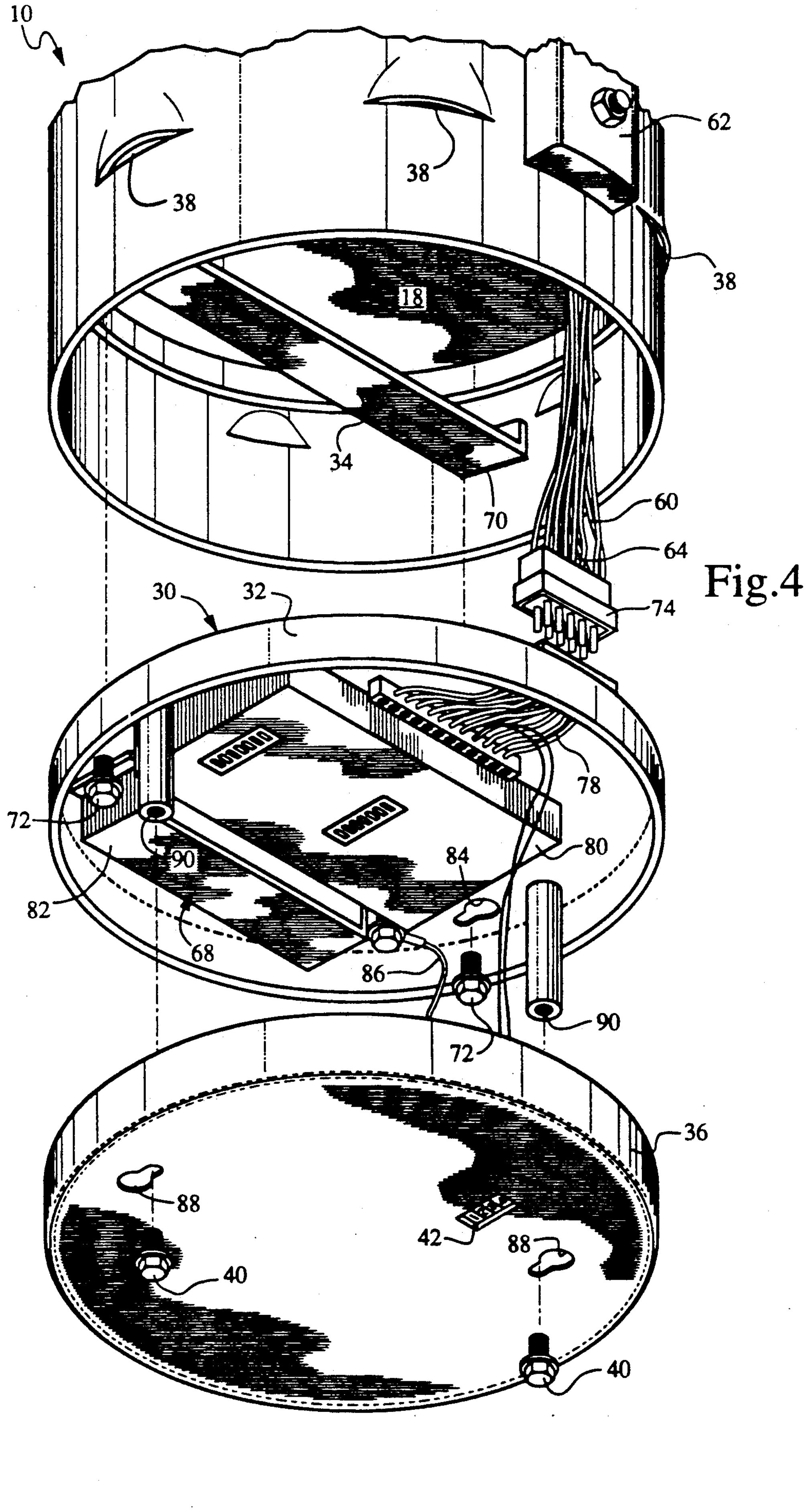
FIG. 4 is an exploded perspective view of the lower end of the recloser apparatus.

During operation of the recloser apparatus shown in FIG. 3, when a fault current is sensed by the current transformer 66, a control means 68, shown in FIG. 4, supported in the support pan of the control assembly operates to trip the interrupter contacts 46, 48 by moving the contact 48 to the open position shown in dashed lines in the figure. Thereafter, once a predetermined delay period has lapsed, the movable contact 48 is moved back to the closed position shown in solid lines in FIG. 3, and current is again permitted to pass through the recloser, at least momentarily. If a fault current is again sensed by the current transformer 66 when the interrupter is closed, the control means 68 will again trip the interrupter and open the contacts 46, 48.

This cyclic opening and closing of the interrupter can continue for any desired number of cycles before the control means 68 triggers opening and lockout of the interrupter such that no further automatic closing operations are made. After lockout, it is preferred that a lineman actually visit the recloser to check for permanent faults and manually return the interrupter to a closed position.

The manner in which the control assembly 30 is attached to the recloser tank 10 is shown in FIG. 4. On the recloser tank 10, there is provided the mounting bar 34 which is preferably constructed with a plurality of holes 70 through which bolts 72 may be secured. In addition, the wires 60, 64 leading from the contact moving assembly 58, current transformer 66 and operating assembly 26 are passed through the side wall 16 of the tank 10 and terminate in a male plug member 74 adapted to be received in a cooperating female plug member 76 provided in the support pan 32.

Within the support pan 32, wires 78 extend from the female plug member 76 to the control means 68, which preferably comprises a microprocessor 80 that is programmed to carry out the operational functions discussed above. The microprocessor 80 is powered by a battery 82 that may be of any conventional type. For example, in the preferred embodiment, a lithium battery is used due to the attributes associated therewith, such as its relatively long life and ability to withstand large ambient temperature variations.

The support pan 32 is provided with a pair of holes 84 for receiving the bolts 72 that hold the pan 32 onto the mounting bar 34, these holes 84 being formed of a diameter greater than the diameter of the heads of the bolts 72 and including a radial slot of a diameter smaller than the diameter of the heads of the bolts so that after the bolts 72 are attached to the mounting bar 34, the bolts are retained in the holes 84 by rotating the pan 32 relative to the bolts such that the bolts engage the sides of these slots. Thereafter, the bolts 72 may be tightened in place to secure the pan 32 to the mounting bar 34.

The cover 36 is retained in the proximity of the support pan 32 by a retention cord 86 and includes a pair of holes 88 for receiving the pair of bolts 40 that permit attachment of the cover to the support pan 32. The bolts 40 are adapted to pass through the holes 88 into receiving openings 90 provided in the support pan 32.

Figure 5:
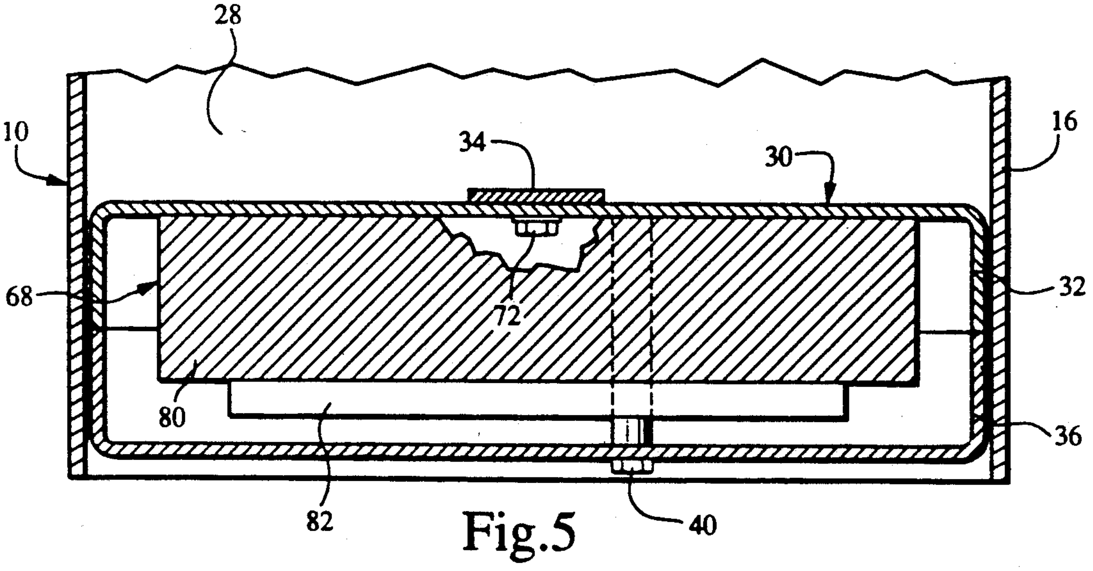
FIG. 5 is a side sectional view of the lower end of the recloser apparatus.

As shown in FIG. 5, once the control assembly 30 is secured to the mounting bar 34 and the cover 36 has been attached, the control assemblY 30 is protected from exposure to solar radiation by the side wall 16 of the tank 10 which extends below the cover 36. In addition, protection is afforded the control assembly 30 from mechanical shocks and blows that might be experienced during movement or installation of the recloser apparatus by the side wall 16 of the recloser tank which is separated slightly from the support pan 32 and cover 36 to permit a slight amount of relative movement therebetween, and provide an air flow path between the wall 16 and the support pan 32. Further protection is provided by positioning the control means 68 in the central region of the support pan 32 away from the side wall of the pan.

Figure 6:
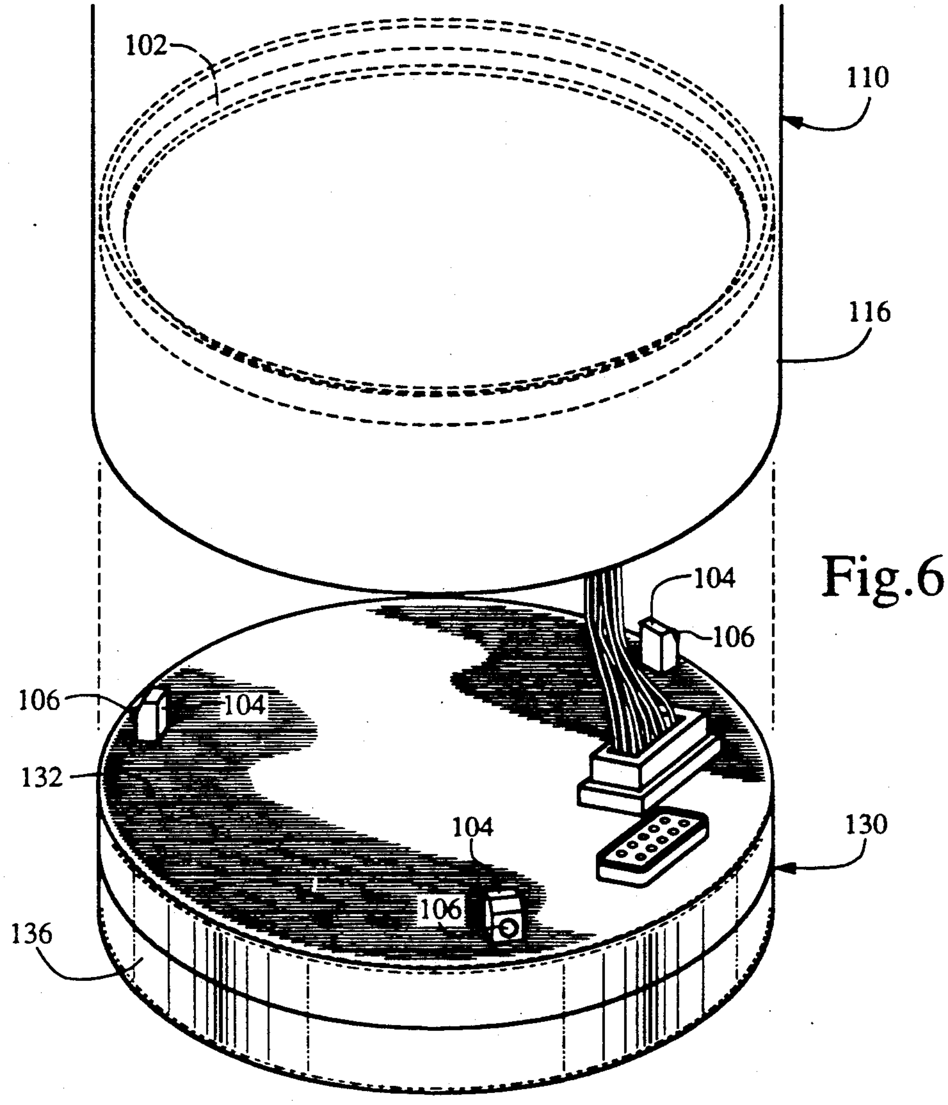
FIG. 6 is an exploded perspective view of an alternate construction of a recloser apparatus according to the invention.
Figure 7:
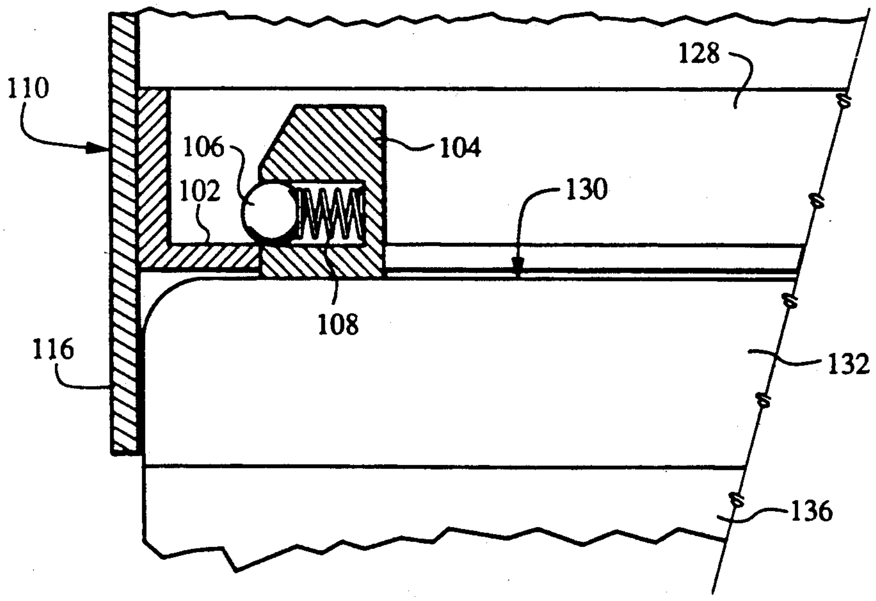
FIG. 7 is a side sectional view of the lower end of the recloser apparatus of FIG. 6.

A second construction of a recloser apparatus in accordance with the invention is shown in FIGS. 6 and 7. As illustrated in FIG. 6, the recloser includes a tank 110 having a side wall 116 extending beyond a bottom wall (not shown) by a distance of several inches. An inward extending flange 102 is provided on the inner surface of the side wall 116 of the tank 110, e.g. through the provision of an L-shaped strip of material secured to the side wall 116 by welding or other conventional means.

In this second construction, the support pan 132 is provided with a plurality of upstanding mounting elements 104, each provided with a detent member 106 which protrudes radially outward of the mounting element 104 and is biased outward of the support pan 132 by a spring 108 or the like. Through the provision of these mounting elements 104, the control assembly 130 may be secured to the side wall 116 of the tank 110 by forcibly pushing the assembly 30 up into the exterior space 128 defined by the side wall 116, as shown in FIG. 7, until the detent members 106 engage the flange 102 in a snap-fit manner to hold the pan 132 in place.

A plug arrangement similar to the plug arrangement discussed above with respect to the first construction is preferably provided to permit connection and disconnection of the wires leading to the operating assembly and current transformer, as well as to any counter driving mechanism that may be provided in the recloser. Also, in the second construction, the cover 136 may be attached to the support pan 132 in the same manner as in the first construction.

Although the invention has been described with reference to the illustrated preferred embodiment, it is understood that substitutions may be made and equivalents employed herein without departing from the scope of the present invention as set forth in the claims. For example, it may be desirable to use an oval rather than a cylindrical tank, in which case it would be advantageous to provide a shielded space on a side of the tank by extending a side wall thereof beyond the sealed interior space of the tank.

What is claimed is:

1. An electronic recloser apparatus comprising:

an enclosure having bottom, top and side walls which define an interior, sealed space, and structure defining a shielded space exterior of the interior, sealed space and beneath the bottom wall;

a current interrupter disposed within the sealed space of the enclosure and including a pair of relatively movable contacts movable between a closed, current carrying position and an open, current-interrupting position;

control means for electronically controlling the operation of the current interrupter;

a support pan on which the control means is supported, the support pan and control means together being sized for receipt in the shielded space; and mounting means for mounting the support pan and control means beneath the bottom wall of the enclosure within the shielded space.

2. The recloser apparatus as recited in claim 1, wherein the side wall of the enclosure extends beyond the bottom wall to define the shielded space.

3. The recloser apparatus as recited in claim 1, wherein the mounting means includes attachment means for releasably attaching the support pan and control means to the apparatus.

4. A recloser apparatus comprising:

an enclosure having bottom, top and side walls which define an interior, sealed space, and structure defining a shielded space exterior of the interior, sealed space and beneath the bottom wall;

a current interrupter disposed within the sealed space of the enclosure and including a pair of relatively movable contacts movable between a closed, current carrying position and an open, current-interrupting position;

contact moving means for moving the contacts between the closed, current-carrying position and the open, current-interrupting position;

sensing means for sensing a fault current experienced by the apparatus;

control means for electronically controlling the operation of the contact moving means, the control means initiating operation of the contact moving means to move the contacts to the open position in response to a fault current sensed by the sensing means, and initiating operation of the contact moving means to move the contacts to the closed position after each one of a predetermined number of opening operations;

a support pan on which the control means is supported, the support pan and control means together being sized for receipt in the shielded space; and mounting means for mounting the support pan and control means beneath the bottom wall of the enclosure within the shielded space.

5. The recloser apparatus as recited in claim 4, wherein the side wall of the enclosure extends beyond the bottom wall to define the shielded space.

6. The recloser apparatus as recited in claim 4, wherein the mounting means includes attachment means for releasably attaching the support pan and control means to the apparatus.

7. A single-phase recloser apparatus comprising:

an enclosure having bottom, top and side walls which define an interior, sealed space, and structure defining a shielded space exterior of the interior, sealed space and beneath the bottom wall;

a current interrupter disposed within the sealed space of the enclosure and including a pair of relatively movable contacts movable between a closed, current-carrying position and an open, current-interrupting position;

contact moving means for moving the contacts between the closed, current-carrying position and the open, current-interrupting position;

sensing means for sensing a fault current experienced by the apparatus;

control means for electronically controlling the operation of the contact moving means, the control means initiating operation of the contact moving means to move the contacts to the open position in response to a fault current sensed by the sensing means, and initiating operation of the contact moving means to move the contacts to the closed position after each one of a predetermined number of opening operation;

a support pan on which the control means is supported, the support pan and control means together being sized for receipt within the shielded space; and mounting means for mounting the support pan and control means beneath the bottom wall of the enclosure within the shielded space.

* * * * *